UNITED STATES PATENT OFFICE.

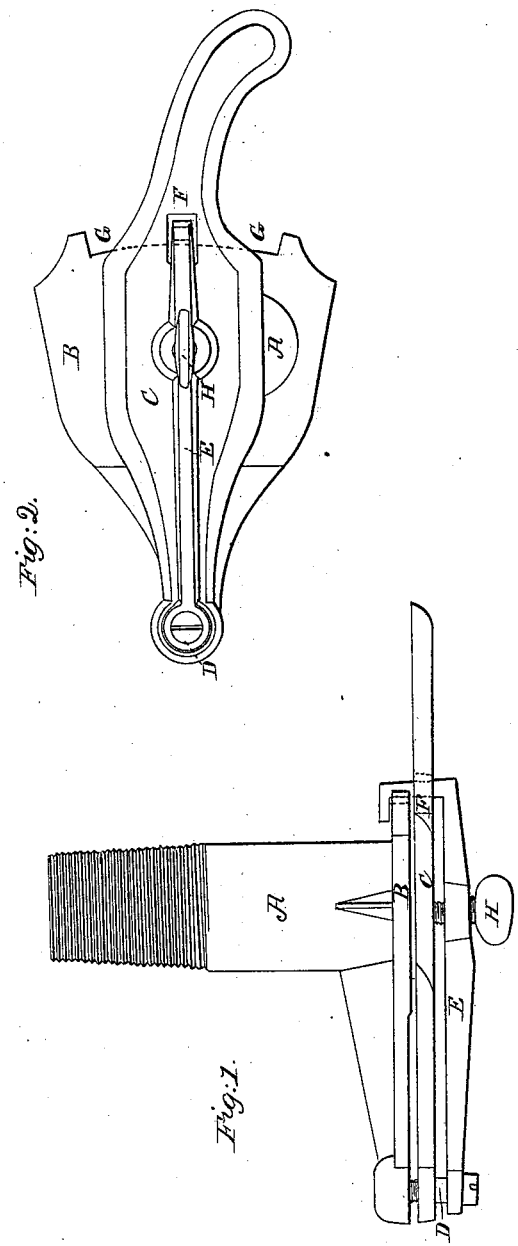

JOSEPH DUDLEY, OF FALL RIVER, MASSACHUSETTS.

MOLASSES-FAUCET.

Specification of Letters Patent No. 5,430, dated February 1, 1848.

*To all whom it may concern:*

Be it known that I, JOSEPH DUDLEY, of Fall River, in the county of Bristol and State of Massachusetts, have invented a new and useful Improvement in Molasses-Gates; and I do hereby declare that the same is fully described and represented in the following specification and accompanying drawing, letters, figures, and references thereof.

Of the said drawings Figure 1, denotes a top view of my improved molasses gate. Fig. 2 is a front elevation of it.

A in Fig. 1 exhibits the screw tube of my improved gate. B the seat or plate against which the lever valve or plate C slides or works, and to which it is jointed, by a pin or fulcrum D.

It is well known that the ordinary gates, after being used a short time, are subject to leak more or less, and that they have no contrivance applied to them by which the pressure of the valve against its seat may be increased to the extent required to stop the leak. The means usually adopted to render them tight, cause the lever or valve to work with so much friction against its seat, as to render it often very difficult (particularly when the molasses becomes hardened or candied between the parts in contact) to move it.

By my improvement I am not only able to move the valve on its seat, with all the ease or facility required, or with little or no friction, but I can readily tighten it, or cause it to press down, or upon its seat, with any degree of force necessary to prevent leakage. For this purpose I apply to the valve or gate C, a lever E, through one end of which the fulcrum pin D is made to pass. The other end of the lever is bent at a right angle, and carried through an orifice F, cut through the lever valve C, after passing through the same, it is again bent at right angles, so as to hook around the edge of the seat plate B, the whole being as seen in the drawings.

The edge G of the seat plate should be curved to the arc of a circle, which will admit of the rising and falling of the lever E with the valve, to which it is connected, the lever being made to work or move on the fulcrum pin D. The said lever E has a screw hole tapped through it, to which a thumb screw H is fitted, the said screw hole and thumb screw being disposed over the central part of the valve.

The thumb screw after passing through the lever E abuts against the valve. On screwing up the screw, the valve will be forced down upon its seat, and the degree of pressure thereon, may be regulated by the screw. When the screw is unscrewed, so as to remove the pressure, the valve may be raised with ease.

What I claim as my invention is—

The clamping lever E, and screw H in combination with the valve and seat plate, the whole being arranged and made to operate together substantially in manner, and for the purpose as specified.

In testimony whereof I have hereto set my signature this fifth day of April A. D. 1847.

JOSEPH DUDLEY.

Witnesses:
 LOUIS LAPHAM,
 ABRAHAM COOK.